United States Patent
Jacobs et al.

(10) Patent No.: US 9,256,936 B2
(45) Date of Patent: Feb. 9, 2016

(54) METHOD AND APPARATUS FOR TRACKING OBJECTS IN A TARGET AREA OF A MOVING ORGAN

(71) Applicant: Pie Medical Imaging BV, Maastricht (NL)

(72) Inventors: Sander Jacobs, Maastricht (NL); Jean-Paul Aben, Limbricht (NL)

(73) Assignee: Pie Medical Imaging BV, Maastricht (NL)

(*) Notice: Subject to any disclaimer, the term of this patent is extended or adjusted under 35 U.S.C. 154(b) by 124 days.

(21) Appl. No.: 14/159,783

(22) Filed: Jan. 21, 2014

(65) Prior Publication Data

US 2014/0205145 A1      Jul. 24, 2014

(30) Foreign Application Priority Data

Jan. 22, 2013   (EP) .................................. 13152134

(51) Int. Cl.
*G06T 7/00* (2006.01)
*G06T 7/20* (2006.01)

(52) U.S. Cl.
CPC ............ *G06T 7/0012* (2013.01); *G06T 7/0044* (2013.01); *G06T 7/204* (2013.01); *G06T 7/2033* (2013.01); *G06T 2207/10072* (2013.01); *G06T 2207/10116* (2013.01); *G06T 2207/10132* (2013.01); *G06T 2207/30004* (2013.01)

(58) Field of Classification Search
CPC ... G06T 7/0012; G06T 7/0028; G06T 7/0038; G06T 7/004; G06T 7/0042; G06T 7/0044; G06T 7/2033; G06T 7/204; G06T 2207/30004; G06T 2207/30048; G06T 2207/30101; G06K 2209/051; A61B 5/0044; A61B 5/1107; A61B 6/486; A61B 6/5211; A61B 6/5217; A61B 8/0883; A61B 8/0891; A61B 8/5215; A61B 8/5223

See application file for complete search history.

(56) References Cited

U.S. PATENT DOCUMENTS

| 7,778,688 B2 | 8/2010 | Strommer ..................... 600/424 |
| 8,223,207 B2 | 7/2012 | Baba et al. .................... 348/169 |

(Continued)

FOREIGN PATENT DOCUMENTS

| EP | 2363072 A1 | 9/2011 |
| EP | 2434454 A2 | 3/2012 |

OTHER PUBLICATIONS

"Anatomy-based Registration of CT-Scan and Intraoperative X Ray Images for Guiding a Surgical Robot", A.Gueziec et al., IEEE Transactions on Medical imaging (1998).

"Condensation-Conditional Density Propagation for Visual Tracking", M. Lisard and A.Blake, International Journal of Computer Vision (1998).

(Continued)

*Primary Examiner* — Andrew W Johns
(74) *Attorney, Agent, or Firm* — Gordon & Jacobson, P.C.

(57) ABSTRACT

A method for tracking position of features of a moving organ from at least one sequence of image frames of the moving organ involves identifying at least a first feature and a second feature of the organ in a reference image frame. Positions of the first and second features in other image frames are tracked in order to learn motion patterns of the first and second features. A dynamic geometric relation between the first and second features is determined. In the event that the first feature of the organ is obscured in a given image frame, position of the first feature in the given image frame is determined using position of the second feature in the given image frame and the dynamic geometric relation between the first and second features.

20 Claims, 4 Drawing Sheets

(56) References Cited

U.S. PATENT DOCUMENTS

| | | | |
|---|---|---|---|
| 2004/0116810 A1 | 6/2004 | Olstad | 600/443 |
| 2005/0096543 A1 | 5/2005 | Jackson et al. | 600/441 |
| 2011/0033094 A1 | 2/2011 | Zarkh et al. | 382/128 |

OTHER PUBLICATIONS

"Cardiovascular Signal Decomposition and Estimation with the Extended Kalman Smoother", J. McNames and M. Aboy, Proceeding of IEEE (2006).

"Learning Occlusion with Likelihoods for Visual Tracking", S. Kwak et al., International Conference on Computer Vision (2011).

METHOD AND APPARATUS FOR TRACKING OBJECTS IN A TARGET AREA OF A MOVING ORGAN

CROSS-REFERENCE TO RELATED APPLICATIONS

The present application claims priority from EP 13152134.6, filed on Jan. 22, 2013, herein incorporated by reference in its entirety.

BACKGROUND

1. Field

The present application relates to medical imaging, and more particularly to medical imaging of percutaneous interventions, such as Transcatheter Aortic Valve Implantation (TAVI) procedures.

2. State of the Art

The trend of minimal invasiveness has increased the importance of imaging in clinical interventions. Due to the small incisions made for the interventions, clinicians can no longer use direct visual inspect to navigate their tools, and instead have to rely on intra-procedural images generated from real-time imaging modalities such as X-ray fluoroscopy, ultrasound echography and intra-procedural magnetic resonance imaging.

Image guided navigation driven by visual inspection of the intra-procedural images inherently suffers from limited accuracy and operator bias due to the subjective evaluation by the operator. This effect is more prominent when navigating in moving areas, such as the thoracic region. Furthermore, the intra-procedural images generated by the real-time imaging modalities typically have reduced image quality, and may not always reveal anatomical structures relevant for the clinical procedure. Contrast liquid can be used to visualize the anatomical structures. However, intra-procedural administration of contrast liquid should be limited to prevent patient harm.

Employing an automatic feature tracking mechanism can provide a solution for these issues. Such a mechanism can provide quantitative information about the position of the interventional tools, and their target location. Using this quantitative information during navigation can eliminate the operator bias, and potentially increase the positioning accuracy. Moreover, quantitative information about the position of image features can be used as a reference point to fuse other images, optionally acquired using different imaging modalities as disclosed, for example, in A. Guéziec et al., "Anatomy-based registration of CT-scan and intraoperative X-ray images for guiding a surgical robot", IEEE Transactions on Medical Imaging (1998) or U.S. Pat. No. 7,778,688.

A typical tracking process is initialized by indicating the initial position of the feature that is to be tracked. This can either be done automatically or manually by the user. After this, a prediction on the future position of the feature is made. This prediction is based on a dynamical model describing the expected motion of the feature. By measuring the actual position of the feature, the predicted position is then updated together with the model parameters as disclosed, for example, in the paper by M. Isard and A. Blake, "Condensation— conditional density propagation for visual tracking", International Journal of Computer Vision (1998) or in U.S. Pat. No. 8,223,207. This process is repeated by making a new prediction on the next time step, and is continued until the tracking process is stopped.

When the tracked feature is obscured, the tracking process can be continued by generating new predictions on the feature position for future time steps. However, no measurements can be performed, meaning that no corrections can be made to these predictions. Due to the inevitable differences between the predicted motion and the actual motion, modelling errors will stack, and the predicted feature position will diverge from the true position. Furthermore, the actual motion may be different from the predicted motion due to physiological reaction of the body in response of the insertion of an interventional tool. Consequently, when the feature is obscured, these tracking mechanisms can only provide an accurate position of the tracked object for a limited time.

US Patent Publ. No. 2011/0033094 discloses a method for navigating a therapeutic device to a location by continuing to give an estimated position of the device target location, despite being unable to visually identify this area in intra-procedural X-ray fluoroscopy images. This is achieved by tracking a feature, which is visible during X-ray fluoroscopy, in the vicinity of the device target location assuming the feature experiences the same motion as the device target location. As a result, the geometric relation between the tracked feature and the device target location remains constant under all circumstances. By establishing this geometric relation in a pre-procedural image, the device target location can be derived in the intra-procedural from the position of the tracked feature during X-ray fluoroscopy.

In case of trans-catheter heart valve placement, the aortic annulus is the target location, and is invisible without administration of contrast liquid in intra-procedural X-ray images, while the tracked feature can be any anatomic or artificial object which is distinguishable during X-ray fluoroscopy and has the same motion pattern as the aortic root, typically a calcified area near the valves or a stent or any other deployed device.

Using these tracking mechanisms to guide interventional tools to a certain location can, however, pose problems if the tracked feature resides near the target location of the tool. If the tool approaches its target location, the presence of the tool can, in fact, deform or occlude the tracked feature, preventing an accurate localization by the tracking mechanism.

Tracking such feature during intervention is, in fact, not easy to achieve. As long as the therapeutic device approaches the target location, the annulus (and thus the calcifications) will respond to the presence of the therapeutic device. More particularly, the calcifications tend to deform, which can cause the tracking algorithm to fail. Also, the deformation of the calcifications can modify the geometric relation which is used to reconstruct the target location with a consequent reduction of accuracy, which may be crucial for the success of the intervention. If another feature is used instead of calcification spots, this is subjected to the same problems. Moreover, stent or any other metallic interventional devices tend to move with a different motion relative to motion of the target location. Especially if a stent is selected distal to the coronary ostia, the motion of this stent will be significantly different to the motion of the target location.

There's thus the need to improve the tracking process to avoid positioning errors which may be crucial for the success of the intervention.

SUMMARY

It is thus an object of the present application to provide an improved method for tracking objects in a target area of a moving organ, particularly for use in minimally invasive interventions.

The embodiments of the present application reach this aim with a method for tracking objects in a target area of a moving organ from sequences of consecutive image frames of the organ, where such image frames are timely separated by a certain time interval. The method involves identifying at least a first feature and at least a second feature in at least one reference image frame of the organ. The first and second features can be subject to synchronized periodic motion. The first feature can be the target area itself or any feature that experiences the same motion as the target area such as, for example, a calcified spot. The positions of such first and second features are tracked in other image frames of the organ in order to learn motion patterns of such features. A dynamic geometric relation between the first and second features is determined. The geometric relation can be a distance or other type of geometric relation. In the event that the first feature is obscured in a manner that is not visbile within an image frame of the organ, the position of the first feature in the image frame is determined based upon the position of the second feature and the geometric relation between the first and second features.

The embodiments of the present application can employ the property of synchronized periodic motion to establish the dynamic geometric relationship between the tracked first and second features. This makes the embodiments generally applicable for all situations where periodic motion is involved, without assuming any specific global motion model. When one of the tracked features is obscured, knowledge about the periodic motion patterns of both features, the position of one of the features, and the phase of the periodic motion can be used to derive the position of the obscured feature.

If the tracked first feature is the device target location itself, such location is immediately determined. If the tracked first feature is not the target location, but a feature that experiences the same motion as the target location, the position of the device target location can be derived from the position of the tracked first feature by using the geometric relation between the first feature and the target area, which is typically determined in a pre-procedural image as taught, for example, in US Patent Appl. No. 2011/0033094.

In the case of a TAVI procedure, the device target location is visualized in an aortogram. This requires injection of a contrast agent, since the aortic root contours are hardly visible without contrast agents. The first feature can be any object residing in, or close to the aortic annulus, such as a deployed device, or a calcified area. The second feature is not generally located in the aortic annulus. It can be, for example, a deployed device in the vicinity of the first feature or any other object which does experience the same motion as the first feature.

Motion patterns of the tracked features can be used to determine dynamic relation of the same. Such motion patterns can be extracted from the average motion of the features over tracked periods. Period boundaries are determined, for example, with automatic auto-regression methods and/or manual annotation and/or using external input signals, such as ECG, blood pressure, or similar. These external input signals can also be employed to aid the tracking process in general by providing quantitative feedback on the phase of the periodic motion.

In one example, the dynamic geometric relation can be determined by computing the difference between motion patterns of the features for all or some of the phases in the periodic motion cycle, and mapping these geometric relations to the corresponding phase. Through interpolation of the mapped set of learned geometric relations, the geometric relations for all phases of the periodic motion cycle can be derived.

When a multitude of image sequences is used to establish the geometric relations between the features and the device target location, all image frame sequences are preferably acquired under the same geometric conditions. In the case of 2-dimensional X-ray imaging, identical projection angles can be used. Using a biplane X-ray setup to establish 3-dimensional geometric relations between the tracked features and the target area, allows different X-ray projections during the method. Alternatively, different imaging modalities can be used to determine the geometric relation of the first feature to the target area, such as CT, MRI or Ultrasound. This can reduce the number of acquisitions necessary and thus patient exposure to radiation and contrast agent.

More than two features can be identified. In this case, the first feature still experiences the same motion as the target area. The other tracked features can be subject to any periodic motion pattern, as long as this motion is synchronized with the target area. By tracking a multitude of features, the probability that all features are simultaneously obscured is decreased, increasing the overall robustness of the method.

The embodiments of the present application also relate to a computer product directly loadable into the memory of a computer and comprising software code portions for performing the method as disclosed above when the product is run on a computer.

According to another aspect, the embodiments of the present application relate to a monoplane, biplane or rotation angiographic X-ray apparatus for acquiring two-dimensional images. The apparatus comprises means for obtaining a cine of consecutive image frames of the aortic root of a patient and processing means programmed for performing the method according to the invention to track one or more features of a target area of the aortic root of the patient, for example to navigate a stent or a valve.

The apparatus is advantageously adapted to capture fluoroscopy images and aortograms. Fluoroscopy images are mainly used for determining the position of all tracked features and their internal geometric relations, while aortograms are mainly used to determine the device target location and its geometric relation to one of the tracked features.

Further improvements form the subject of the dependent claims.

BRIEF DESCRIPTION OF THE DRAWINGS

FIG. 4 shows how, if a feature is obscured, its position can be derived from the position of a different feature using the learnt periodic distance function and the current phase of the periodic motion.

DETAILED DESCRIPTION OF THE PREFERRED EMBODIMENTS

The characteristics of the embodiments of the present application and the advantages derived therefrom will be more apparent from the following description of non-limiting embodiments as illustrated in the annexed drawings.

The embodiments of the present application are particularly advantageous in image guidance during minimally invasive cardiovascular interventions based on 2D angiographic film of X-ray images and it will be mainly disclosed with reference to this field. Examples of such interventions are percutaneous coronary interventions (PCI) and percutaneous aortic valve replacement (PAVR).

Examples of trackable features for these interventions include anatomical structures, interventional tools, and deployed devices. Such features are typically subject to periodical motion originating from the beating heart. Because the motion of such features is governed by the same source, the phase of the motion is synchronized at all time. Due to the complex non-linear deformations of the heart, no simple global motion model (such as affine model of rigid motion) can accurately describe the deformation of the heart.

Moreover, one of the tracked features should remain visible at all times, and thus it should reside at a significant distance from the feature of interest. As the distance between the features increases, the errors of these simplified motion models will also increase. Learning the periodic motion patterns of all tracked features separately provides a method to overcome the need for complex motion modelling.

The operations of the embodiments of the present application can conceptually be split in two distinct phases: a learning phase and a tracking phase. During the learning phase, the periodic motion patterns of features are analyzed and learnt to establish the relation between feature pairs. During the tracking phase, the learnt motion patterns are used to derive the position of obscured features, as long as one other feature remains visible. Any frequency change in motion, for example due to physiological reaction of the body in response of the insertion of an interventional tool, will have no influence on the tracking accuracy since its motion pattern relationship is known.

Despite the conceptual separation of the learning phase and the tracking phase, behavior from both phases can be combined into a single adaptive tracking method. This allows the method to adapt to small changes in the learned motion patterns.

Figure 1:
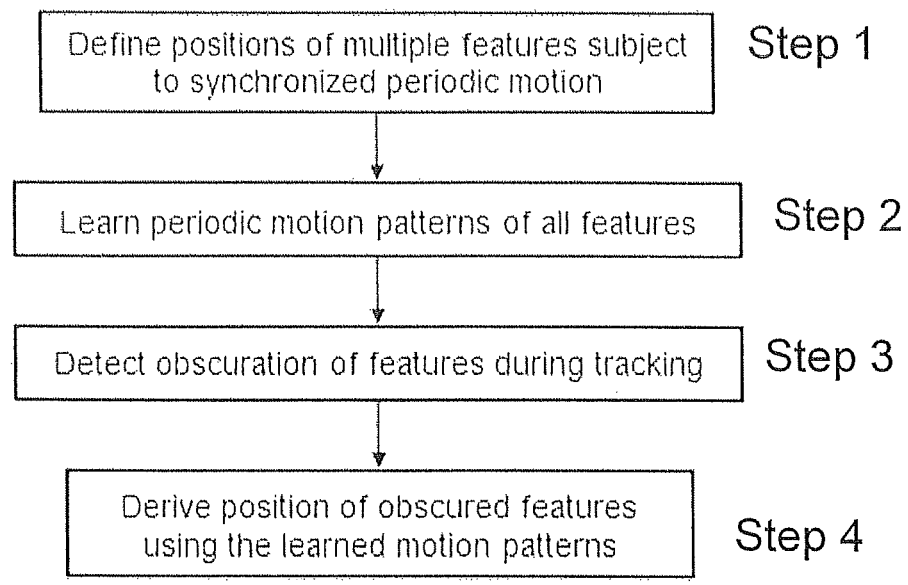
FIG. 1 is a flowchart illustrating an embodiment for tracking objects in a target area of a moving organ from sequences of consecutive images frames of such organ.
Figure 2:
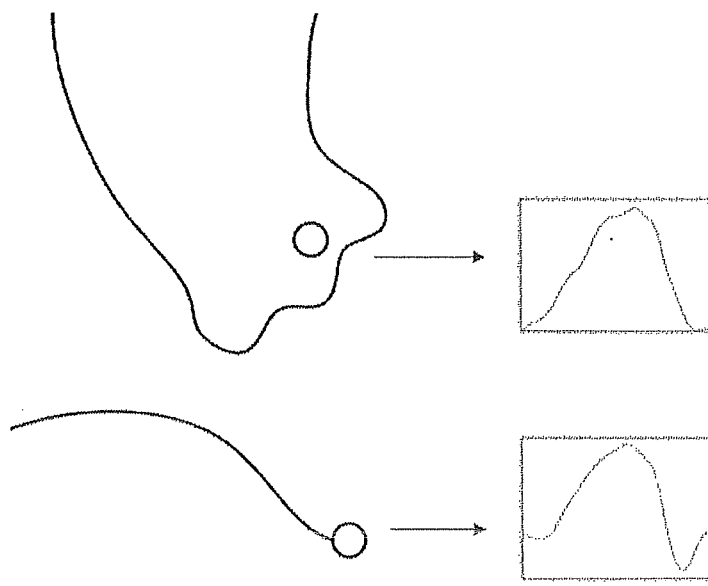
FIGS. 2-4 show a schematic illustration of an aortic root (up) and a deployed instrument in the vicinity (below) with a circle indicating the position of two features to be tracked. During a learning phase all features are tracked to learn their periodic motion pattern as shown in the right part of FIG. 2. The geometric relation between the features as a function of the phase is obtained from the individual feature motion patterns as shown in FIG. 3.
Figure 3:
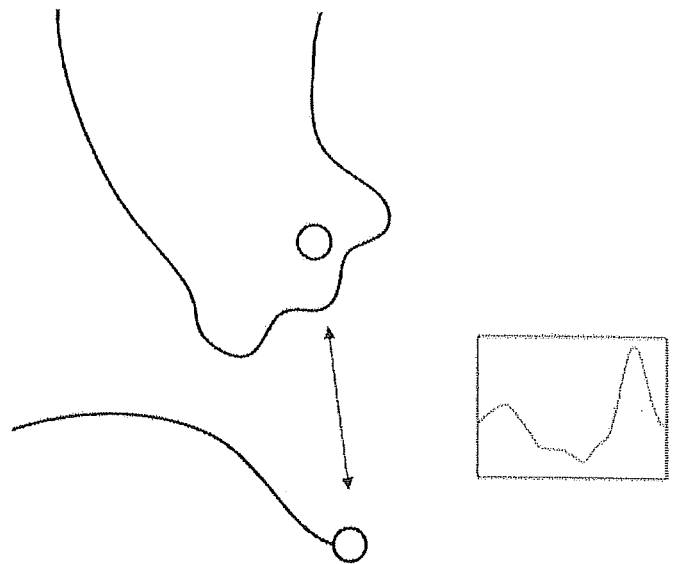
Figure 4:
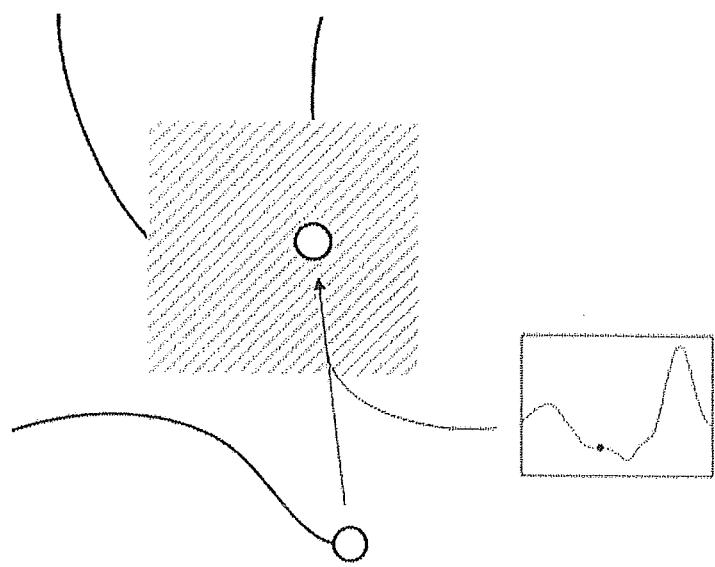

With reference to the flowchart diagram of FIG. 1, the steps of an embodiment for tracking objects in a target area of a moving organ from sequences of consecutive image frames of such organ are now described.

Step 1: Define Initial Positions of Multiple Features Subject to Synchronized Periodic Motion To initialize the tracking process, the initial positions of a plurality of features of the organ can be defined. These features are referred to as "tracked features" herein. These initial positions can be defined in an image frame that is part of a sequence of image frames of the organ such that the features can be tracked through the sequence of image frame. This sequence can either be a real-time stream of image frames, or a pre-recorded sequence of image frames.

The initial position of each respective tracked feature of the organ can be defined by the user, for example by identifying the position of the tracked feature in an image frame by a mouse click, by drawing a region of interest around the tracked feature or other suitable user input. Alternatively, if the visual characteristics of the tracked feature are already known, the system can automatically detect the initial position of the tracked feature in an image frame.

Once the initial positions of the tracked features are known, the system can acquire templates that capture the visual characteristics of the tracked features. These templates can be used to recognize the tracked features in other image frames of the organ in the sequence (or in other sequences).

Step 2: Learn Periodic Motion Patterns of all Features

Having initialized the initial positions of the tracked features, such features can be tracked over time through the image frames of the sequence (or other sequences). A tracking mechanism typically has a dynamical model describing the expected motion of the tracked features. However, since no information is known about the expected motion, a naive model is typically used during this phase.

When the tracked features have been tracked for a sufficient time, a representative periodic motion pattern is derived for each tracked feature. One exemplary method for constructing such representative periodic motion pattern can involve computing the average motion of the tracked features over a number of tracked periods. To accomplish this, the period boundaries should be known. Some examples of finding these period boundaries are: automatic auto-regression methods, manual annotation by the user, and external input signals such as ECG for cardiac motion.

Once the representative periodic motion patters are known for all tracked features, dynamic geometric relations between all pairwise combinations of tracked features can be defined. In one embodiment, the dynamic geometric relation between each given pair of track features can be derived by computing the difference between the motion templates of two features to yield a periodic function that describes the geometric relation between the two features for all phases in the periodic motion cycle. This periodic function can, for example, be implemented by a lookup table, mapping the phase to the relative motion between the two features. When the geometric relations between all of the pairwise tracked feature combinations are defined, the learning phase is completed and the tracking phase can be started.

Step 3: Detect Obscuration of Features During Tracking

The operations of the tracking phase can process the same sequence of image frames of the organ used in the learning phase, or possibly a different sequence of image frames of the organ. Typically, the sequence of image frames processed in tracking phase is a real-time image frame feed. In any case, the geometric relations between all of the pairwise combinations of the tracked features should be known.

The periodic motion patterns of the tracked features as acquired in the learning phase can be used to predict the motion of the tracked features. Additionally, information about the frequency and phase of the periodic motion of the tracked features can be added to the state of the model as taught, for example, by J. McNames and M. Aboy, "Cardiovascular Signal Decomposition and Estimation with the Extended Kalman Smoother". Proceeding of IEEE (2006).

Deviations from the expected motion of the tracked features can indicate feature obscuration. Additionally, different image processing methods exist to automatically detect partial or full obscuration of the tracked features such as those disclosed in S. Kwak et al., "Learning occlusion with likelihoods for visual tracking", International Conference on Computer Vision (2011). Finally, the user can manually indicate when any given tracked feature is obscured. In any case, the system can carry out the indirect tracking mode of Step 4 in the event that obscuration of a given tracked feature is detected for an image frame.

Step 4: Derive Position of Obscured Features Using the Learnt Motion Patterns

When the operations of step 3 detect that a given tracked feature is obscured for an image frame, an indirect feature tracking process is used. This process uses the position of a different tracked feature (which is referred to as the "second tracked feature") in the image frame, the dynamic geometric relation between the obscured tracked feature and the second feature as derived in step 2, and possibly the phase of the periodic motion for these two tracked features in order to derive the position of the obsured tracked feature in the image frame. The derived position of the obscured tracked feature can be used to overlay a visual indication of such position in conjunction with a rendering of one or more image frames in order to visually convey such position to the user. Once the feature obscuration is resolved, the system can return to direct tracking of the given tracked feature.

The positions of one or more tracked features, whether acquired through the direct feature tracking or the indirect feature tracking process of Step 4 can be used to derive an estimated position of a device target location in the event that the device target location is obscured in a manner that makes it visually unidentifiable in an image frame. This method can assume the tracked feature experiences the same motion as the device target location. As a result, the geometric relation between the tracked feature and the device target location remains constant under all circumstances. By establishing this geometric relation in a pre-procedural image frame, the device target location can be derived in the intra-procedural image frame from the position of the tracked feature in such intra-procedural image frame. Such operations are described in detail in US Patent Publ. No. 2011/0033094, herein incorporated by reference in its entirety.

Figure 5:
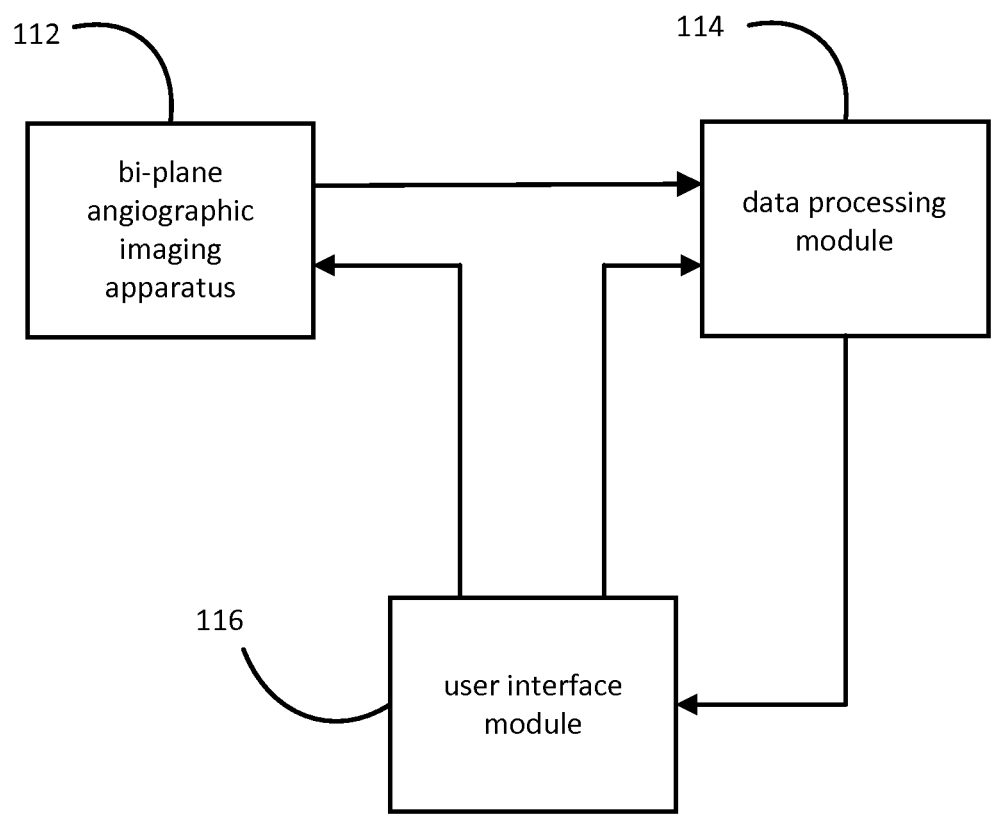
FIG. 5 is a functional block diagram of an exemplary bi-plane angiographic system.

FIG. 5 is a functional block diagram of an exemplary bi-plane angiographic system, which includes a bi-plane angiographic imaging apparatus 112 that operates under commands from user interface module 116 and will provide data to data processing module 114. The bi-plane angiographic imaging apparatus 112 captures two-dimensional X-ray images of the vessel organ of interest for example in the postero-anterior (PA) direction and in the lateral direction (which is substantially orthogonal to the PA direction). The bi-plane angiographic imaging apparatus 112 typically includes a first X-ray source and detector pair mounted on one arm of a supporting gantry as well as a second X-ray source and detector pair mounted on second arm of the supporting gantry. The gantry provides for positioning the arms of the first and second X-ray source and detector pairs at various angles with respect to a patient who is supported on a table between the X-ray source and detector of the respective pair. The data processing module 114 may be realized by a personal computer, workstation or other computer processing system. The data processing module 114 processes the two-dimensional images captured by the bi-plane angiographic imaging apparatus 112 to generate data as described herein. The user interface module 116 interacts with the user and communicates with the data processing module 114. The user interface module 116 can include different kinds of input and output devices, such as a display screen for visual output, a touch screen for touch input, a mouse pointer or other pointing device for input, a microphone for speech input, a speaker for audio output, a keyboard and/or keypad for input, etc. The data processing module 114 and the user interface module 116 cooperate to carry out the operations of FIG. 1 as described herein.

Figure 6:
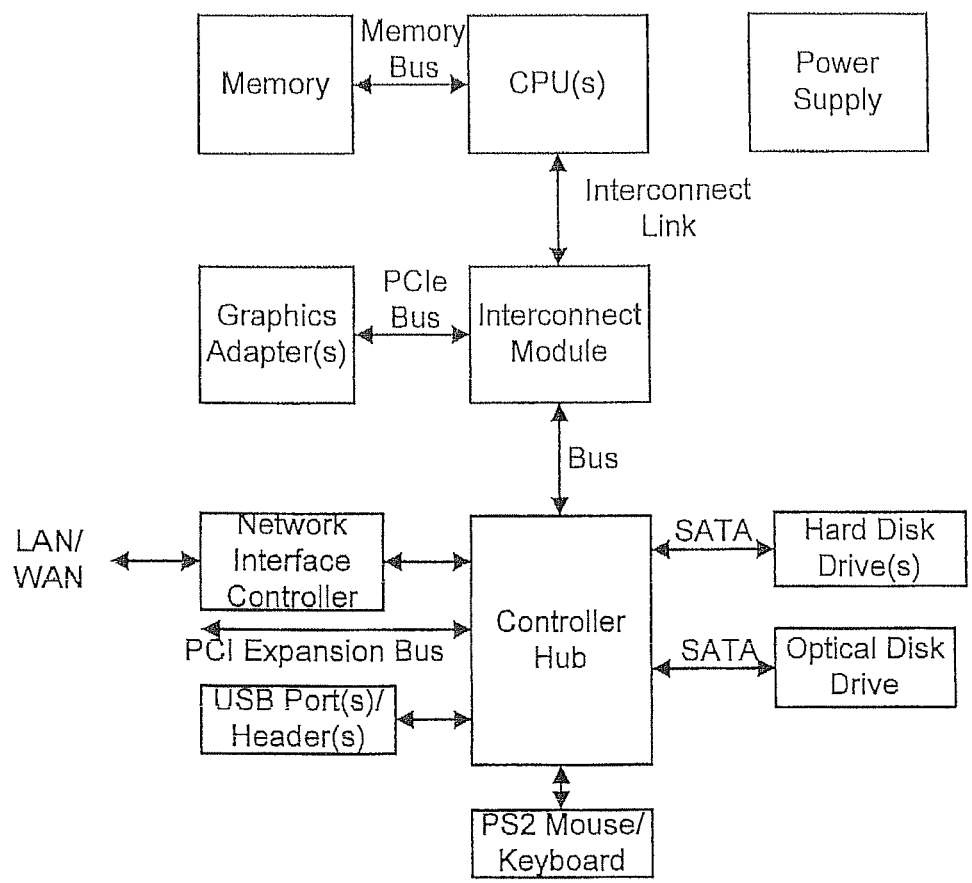
FIG. 6 is a schematic block diagram of a computer workstation.

The operations of FIG. 1 can also be carried out by software code that is embodied in a computer product (for example, an optical disc or other form of persistent memory such as a USB drive or a network server). The software code can be directly loadable into the memory of a data processing system, such as the computer workstation of FIG. 6, for carrying out the operations of FIG. 1 as described herein.

There have been described and illustrated herein an embodiment of a method for tracking objects in a target area of a moving organ from sequences of consecutive image frames of such organ. While particular embodiments have been described, it is not intended that the claims be limited thereto, as it is intended that the claims be as broad in scope as the art will allow and that the specification be read likewise. It will therefore be appreciated by those skilled in the art that yet other modifications could be made to the disclosed embodiment without deviating from its spirit and scope as claimed.

What is claimed is:

1. A method for tracking position of features of a moving organ from at least one sequence of image frames of the moving organ, comprising:
 a) identifying at least a first feature and a second feature of the organ in a reference image frame of the at least one sequence of image frames;
 b) tracking position of the first and second features in other image frames of the at least one sequence of image frames in order to learn motion patterns of the first and second features;
 c) determining a dynamic geometric relation between the first and second features; and
 d) in the event that the first feature of the organ is obscured in a given image frame of the at least one sequence of image frames, determining position of the first feature in the given image frame using position of the second feature in the given image frame and the dynamic geometric relation between the first and second features as determined in step c).

2. A method according to claim 1, wherein:
 said first and second features are subject to synchronized periodic motion.

3. A method according to claim 1, wherein:
 the dynamic geometric relation is a distance between the first feature and the second feature.

4. A method according to claim 1, further comprising:
 using the position of the first feature in the given image frame as derived in d) to derive position of a device target location in the given image frame.

5. A method according to claim 1, wherein:
 the at least one sequence of image frames comprise one or more X-ray images, wherein at least one image is captured with contrast material, showing the first feature, and at least one image is captured without contrast material, showing the second feature.

6. A method according to claim 1, wherein:
 the organ is the aorta, and
 the first feature is located in the aortic annulus.

7. A method according to claim 6, wherein:
 the first feature is the destination location for a therapeutic device.

8. A method according to claim 7, wherein:
 the therapeutic device is a stent or a valve.

9. A method according to claim 1, wherein:
 the first feature is a deployed device or a calcified area.

10. A method according to claim 1, wherein:
 the second feature is a deployed device in the vicinity of the first feature.

11. A method according to claim 1, wherein:
 the operations of b) involve determining average motion of a plurality of features over a number of period boundaries.

12. A method according to claim 1, wherein:
the operations of c) involve determining the difference between motion patterns of pairwise combinations of features for all or some of the phases in the periodic motion cycle.

13. A method according to claim 1, wherein:
more than two features are identified, one of them being rigidly coupled to, and/or moving together with, the target position of a stent or a valve to be navigated to the aortic root, the other features being subject to synchronized periodic motion.

14. A method according to claim 1, wherein:
multiple X-ray projections are used to establish the geometric relation between the first and second features.

15. A method according to claim 1, wherein:
the geometric relation between the first and second features is established using different imaging modalities.

16. A method according to claim 1, wherein:
the operations of b) and c) are carried out in a learning phase where periodic motion patterns of a plurality of features are learnt to determine the geometric relations between pairswise combination of features; and
the operations of d) are carried out in a tracking phase wherein the position of an obscured feature is determined using the tracked position of another feature and the dynamic geometric relation between the obscured feature and the other feature as determined in the learning phase.

17. A method according to claim 16, wherein:
the learning phase and the tracking phase are combined in a single adaptive phase.

18. A non-transitory computer-readable medium that embodies software code portions for performing the method according to claim 1.

19. An X-ray apparatus for acquiring bi-dimensional images, the apparatus comprising:
means for obtaining a cine of consecutive image frames of the aortic root of a patient; and
processing means programmed for performing the method according to claim 1 to track one or more features of a target area of the aortic root of the patient.

20. An X-ray apparatus according to claim 19, further comprising:
means for capturing aortograms and fluoroscopy images, said aortograms used to determine the position of the first feature, and said fluoroscopy images used to determine the position of the second feature.

* * * * *